US007956922B2

(12) United States Patent
Kaji et al.

(10) Patent No.: US 7,956,922 B2
(45) Date of Patent: Jun. 7, 2011

(54) VIEWFINDER AND IMAGE PICKUP APPARATUS

(75) Inventors: Eiji Kaji, Kanagawa (JP); Toru Kirihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 12/120,973

(22) Filed: May 15, 2008

(65) Prior Publication Data
US 2008/0284895 A1    Nov. 20, 2008

(30) Foreign Application Priority Data

May 18, 2007 (JP) .............................. P2007-132370

(51) Int. Cl.
*H04N 5/222* (2006.01)
*H04N 5/225* (2006.01)
*G03B 13/02* (2006.01)

(52) U.S. Cl. .................... 348/333.07; 348/375; 396/374
(58) Field of Classification Search ............. 348/333.06, 348/333.07, 375; D16/202; 396/374
See application file for complete search history.

(56) References Cited

U.S. PATENT DOCUMENTS

| | | | | |
|---|---|---|---|---|
| 4,757,388 A * | 7/1988 | Someya et al. | ............ | 348/211.6 |
| 5,659,361 A * | 8/1997 | Jin | ................ | 348/375 |
| 5,790,193 A * | 8/1998 | Ohmori | ........................ | 348/375 |
| 5,801,774 A * | 9/1998 | Seo | ............................. | 348/333.06 |
| 6,778,775 B1 * | 8/2004 | Auffret | ........................... | 396/374 |
| 7,483,074 B2 * | 1/2009 | Bang et al. | ..................... | 348/373 |
| 2004/0160523 A1 * | 8/2004 | Mogi et al. | ..................... | 348/333.07 |
| 2005/0122416 A1 * | 6/2005 | Ryu et al. | .................. | 348/333.07 |
| 2005/0141099 A1 * | 6/2005 | Bang et al. | ....................... | 359/679 |
| 2006/0082682 A1 * | 4/2006 | Schmidt | ........................ | 348/375 |
| 2008/0049135 A1 * | 2/2008 | Okudaira | .................. | 348/333.06 |
| 2008/0198253 A1 * | 8/2008 | Yanagisawa | ............. | 348/333.01 |
| 2008/0198255 A1 * | 8/2008 | Kirihara et al. | .............. | 348/341 |

FOREIGN PATENT DOCUMENTS

| | | |
|---|---|---|
| JP | 5 83608 | 4/1993 |
| JP | 10 322575 | 12/1998 |
| JP | 2004 147232 | 5/2004 |

* cited by examiner

*Primary Examiner* — David L Ometz
*Assistant Examiner* — Dillon Durnford-Geszvain
(74) *Attorney, Agent, or Firm* — Frommer Lawrence & Haug LLP; William S. Frommer; Thomas F. Presson

(57) ABSTRACT

A viewfinder includes a main body detachably attached to a camera body, a display unit on which an image captured at the camera body is displayed, and an eyepiece unit detachably attached to the display unit. The eyepiece unit magnifies the image. The display unit includes a support connected to the main body in a rotatable manner, a display panel having a display surface on which the image is displayed, and a connecting mechanism that connects the display panel to the support in a rotatable manner. The support and the display panel can be set to a first folded state in which a rear surface of the display panel that is opposite to the display surface is placed on the support, a second folded state in which the display surface is placed on the support, and an unfolded state in which the display panel is raised from the support.

9 Claims, 16 Drawing Sheets

VIEWFINDER AND IMAGE PICKUP APPARATUS

CROSS REFERENCES TO RELATED APPLICATIONS

The present invention contains subject matter related to Japanese Patent Application 2007-132370 filed in the Japanese Patent Office on May 18, 2007, the entire contents of which being incorporated herein by reference.

BACKGROUND OF THE INVENTION

1. Field of the Invention

The present invention relates to a viewfinder and an image pickup apparatus.

2. Description of the Related Art

Image pickup apparatuses used for business purposes in broadcast stations or the like include a camera body for shooting objects to generate video signals and a viewfinder attached to the camera body to display images based on the video signals.

When this type of image pickup apparatus is used, a user carries the camera body on the shoulder and looks through the viewfinder during shooting.

Japanese Unexamined Patent Application Publication No. 2004-147232 discloses an example of a viewfinder used in such an image pickup apparatus. The viewfinder includes a display unit and an eyepiece unit. The display unit has a display panel and displays an image on the display panel. The eyepiece unit is detachably attached to the display unit and magnifies the image displayed on the display panel.

In this viewfinder, the display panel is rotatable, and the eyepiece unit is also rotatable together with the display panel while the eyepiece unit is attached to the display unit. Therefore, shooting can be carried out even when the camera body is removed from the shoulder and tilted upward or downward.

The eyepiece unit of the viewfinder can be removed from the display unit depending on the shooting conditions, so that the user can perform shooting while directly viewing the image displayed on the display panel.

SUMMARY OF THE INVENTION

In the above-described viewfinder, after the eyepiece unit is removed from the display unit, the display surface of the display panel faces a certain direction, that is, leftward or rightward. Therefore, when the camera body is carried on the shoulder, the user views the display surface of the display panel from the left or right of the camera body. Thus, the user is caused to be in an uncomfortable position and the shooting angle is limited.

In view of the above-described situation, it is desirable to provide a user-friendly viewfinder and an image pickup apparatus in which a display surface of a display panel can be easily viewed even when an eyepiece unit is removed from a display unit.

A viewfinder according to an embodiment of the present invention includes a main body detachably attached to a camera body, a display unit on which an image captured at the camera body is displayed, and an eyepiece unit detachably attached to the display unit, the eyepiece unit magnifying the image displayed by the display unit. The display unit includes a support connected to the main body in a rotatable manner, a display panel having a display surface on which the image is displayed, and a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support.

An image pickup apparatus according to another embodiment of the present invention includes a camera body that captures an image and a viewfinder provided on the camera body. The viewfinder includes a main body detachably attached to the camera body, a display unit on which an image captured at the camera body is displayed, and an eyepiece unit detachably attached to the display unit, the eyepiece unit magnifying the image displayed by the display unit. The display unit includes a support connected to the main body in a rotatable manner, a display panel having a display surface on which the image is displayed, and a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support.

An image pickup apparatus according to another embodiment of the present invention includes a camera body that captures an image and a viewfinder provided on the camera body. The viewfinder includes a main body formed integrally with the camera body, a display unit on which an image captured at the camera body is displayed, and an eyepiece unit detachably attached to the display unit, the eyepiece unit magnifying the image displayed by the display unit. The display unit includes a support connected to the main body in a rotatable manner, a display panel having a display surface on which the image is displayed, and a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support.

According to the embodiments of the present invention, in the case in which the display surface of the display panel is directly viewed, the display panel can be set to the unfolded state and be rotated on the main body while being in the unfolded state. Therefore, the user can easily view the display surface of the display panel without being in an uncomfortable position, and the shooting angle can be freely changed. Thus, the user friendliness is increased.

DESCRIPTION OF THE PREFERRED EMBODIMENTS

Embodiments of the present invention will be described below with reference to the accompanying drawings.

First, an image pickup apparatus according to an embodiment of the present invention will be described. Then, a viewfinder included in the image pickup apparatus will be described.

Figure 1:
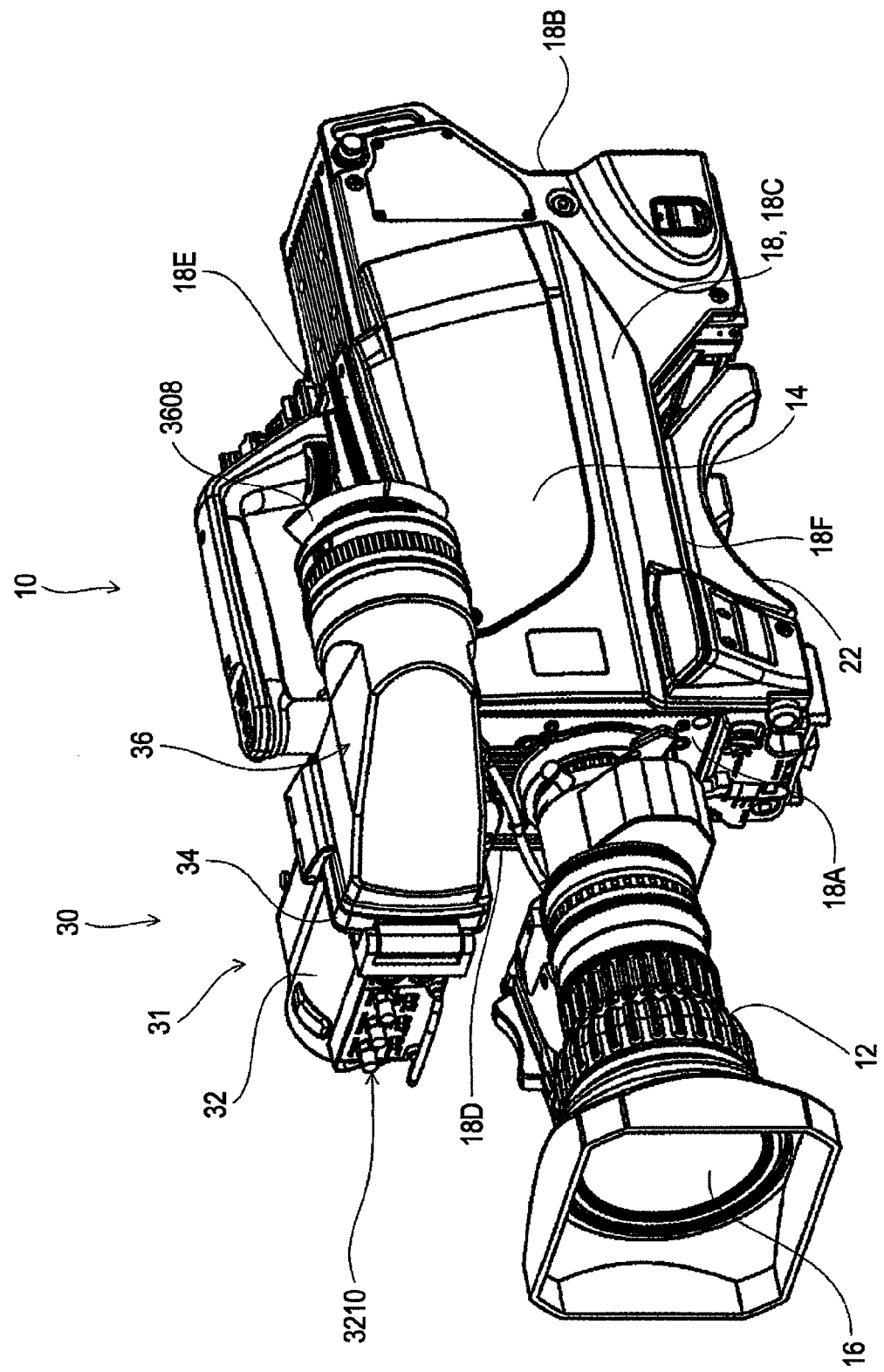
FIG. 1 is a perspective view of an image pickup apparatus including a viewfinder.
Figure 2:
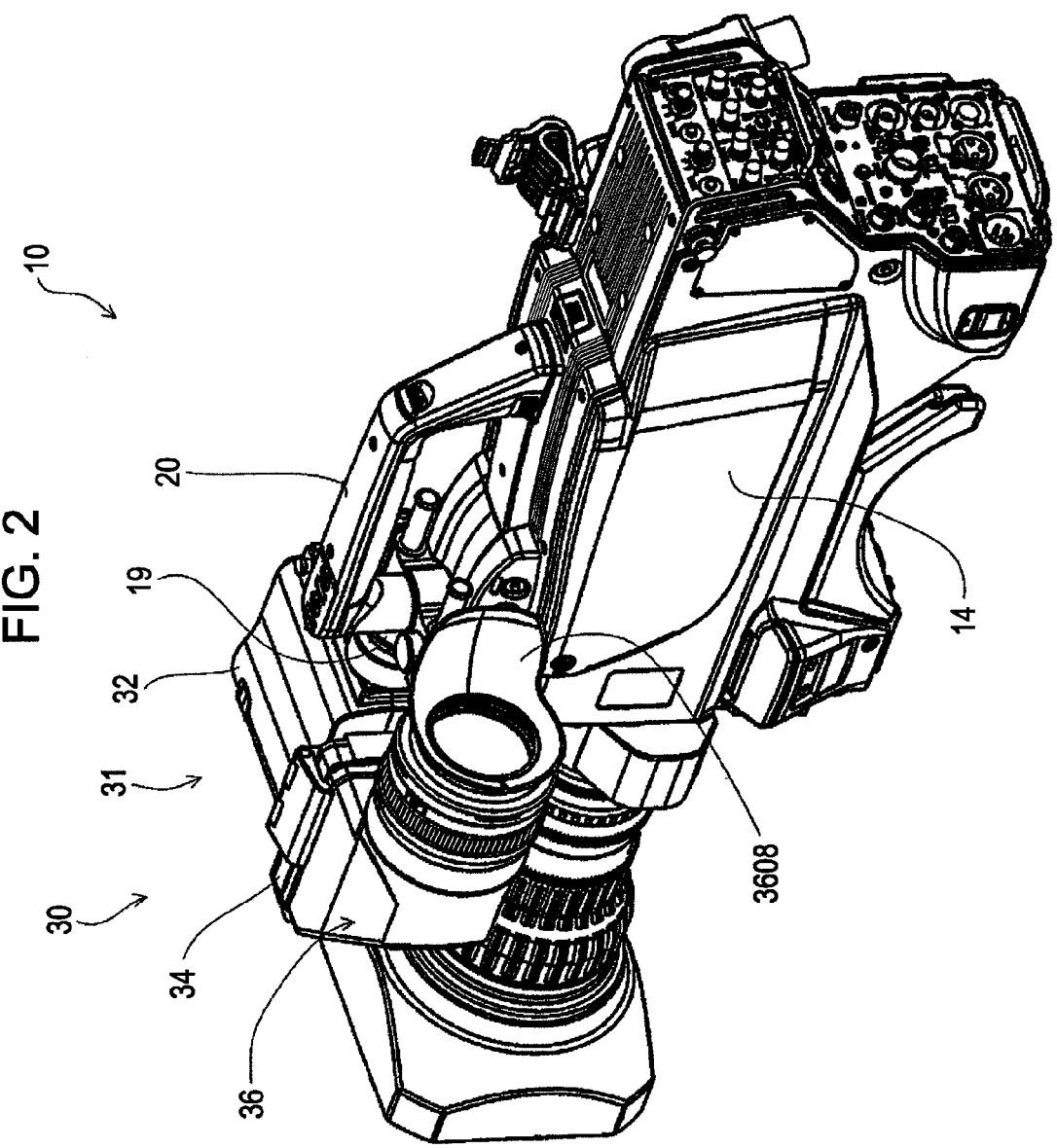
FIG. 2 is another perspective view of the image pickup apparatus including the viewfinder.
Figure 3:
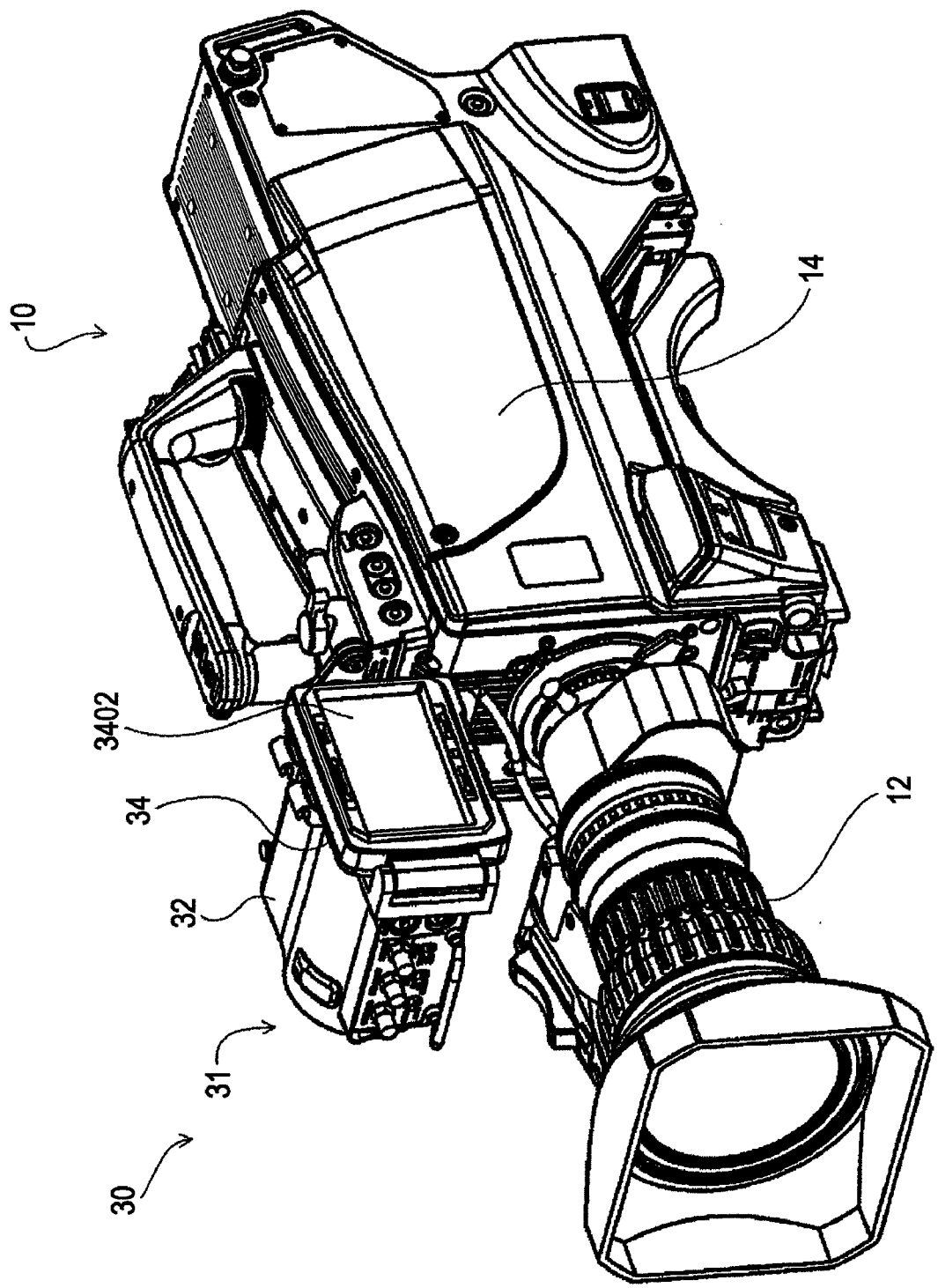
FIG. 3 is a perspective view of the image pickup apparatus illustrating a first folded state of a display panel.
Figure 4:
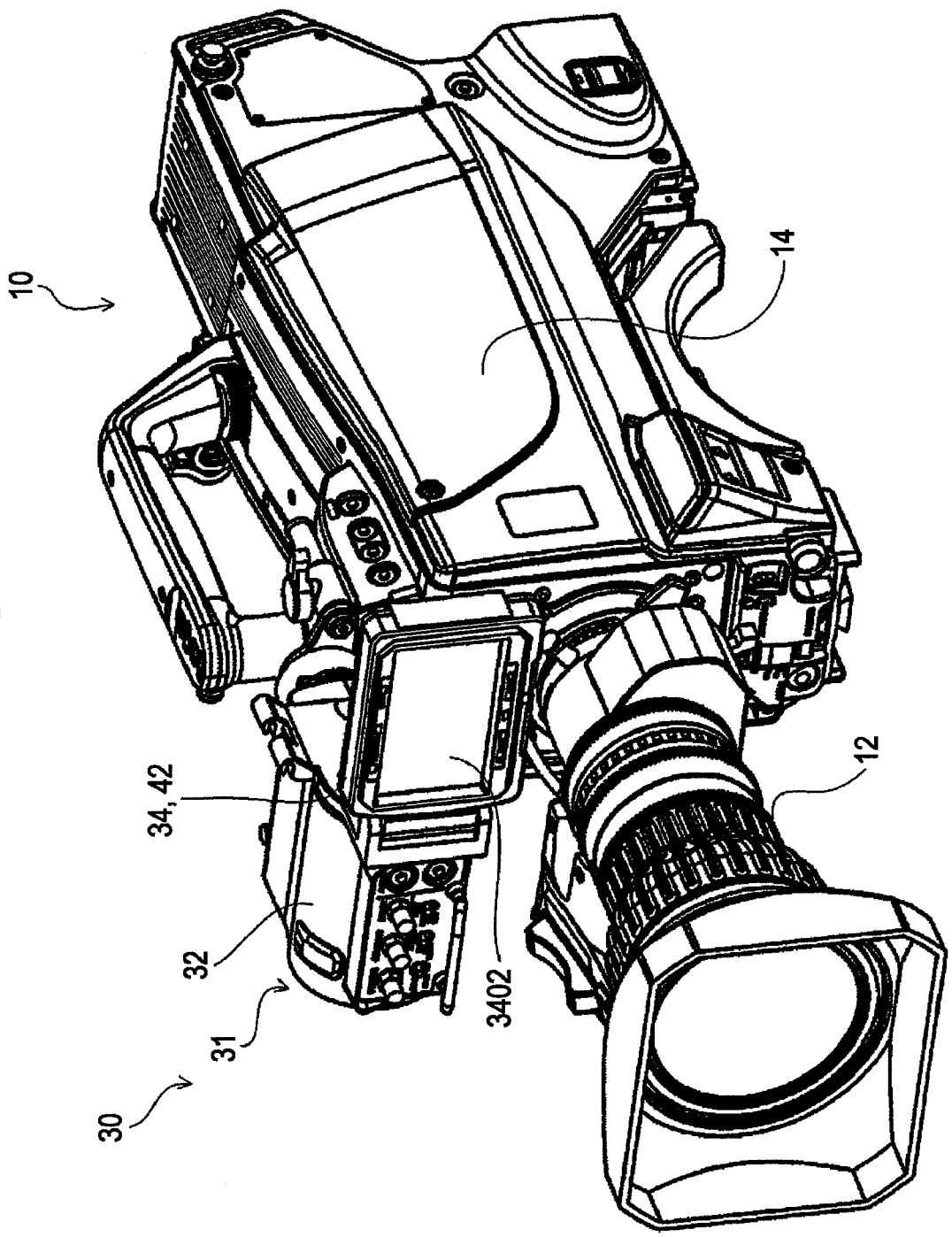
FIG. 4 is a perspective view of the image pickup apparatus illustrating an unfolded state of the display panel in which a display surface faces forward.
Figure 5:
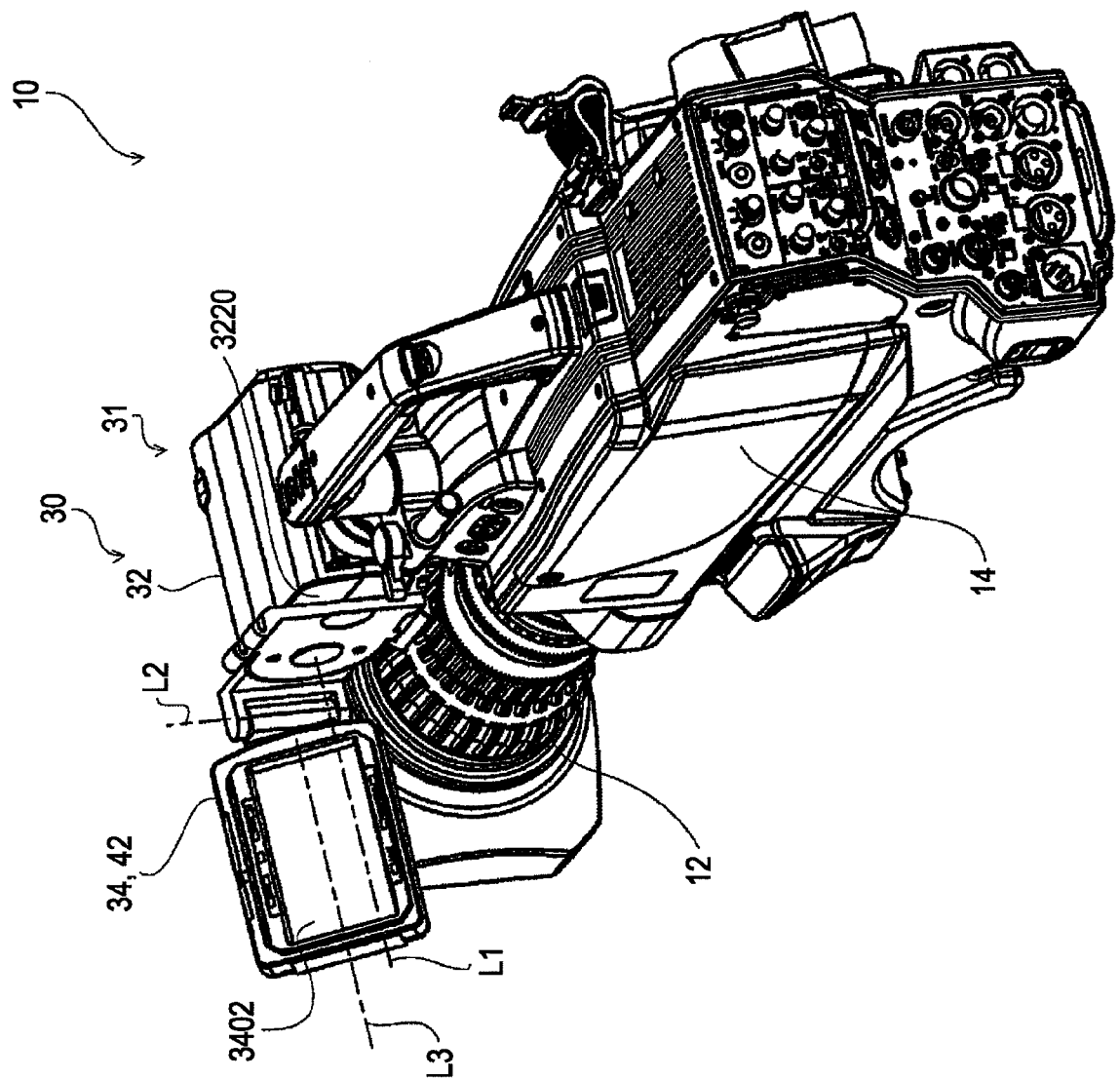
FIG. 5 is a perspective view of the image pickup apparatus illustrating an unfolded state of the display panel in which the display surface faces rearward.
Figure 6:
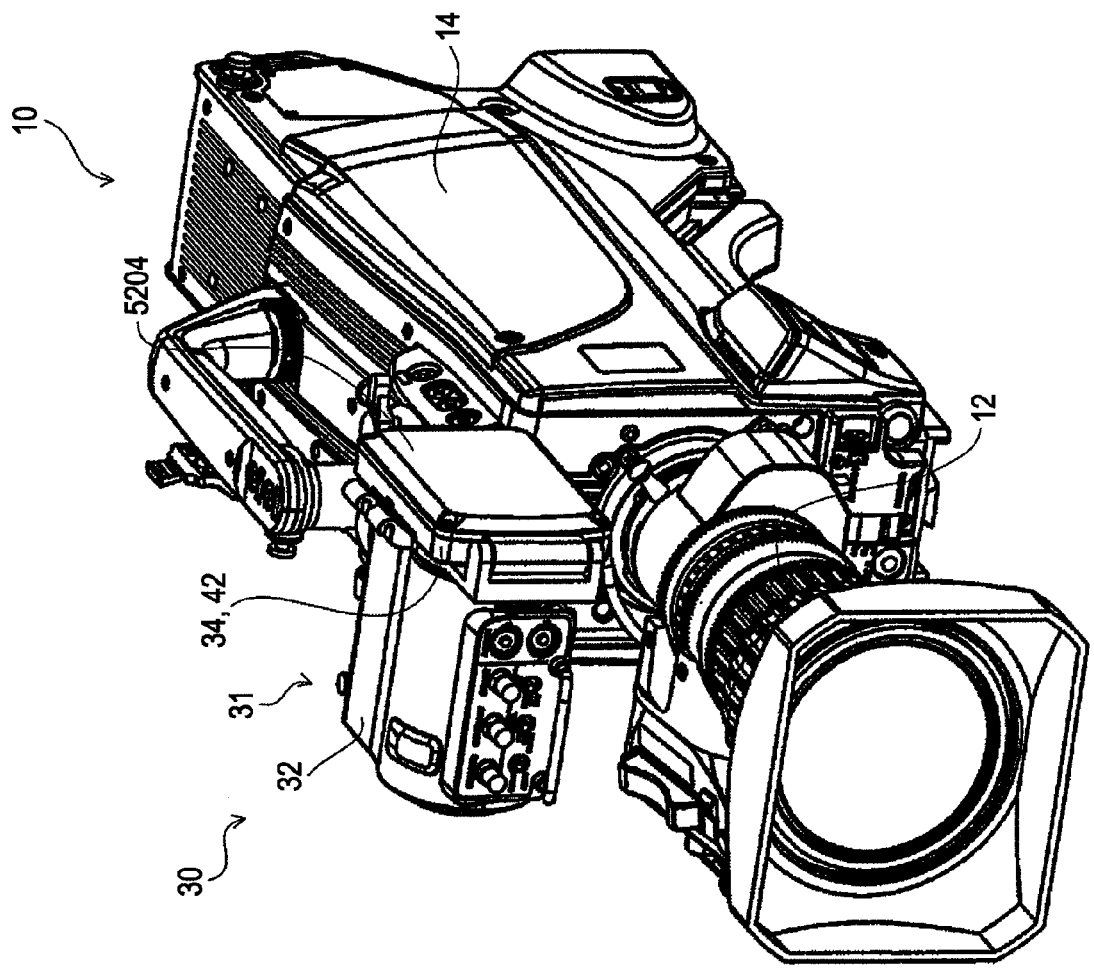
FIG. 6 is a perspective view of the image pickup apparatus illustrating a second folded state of the display panel.
Figure 7:
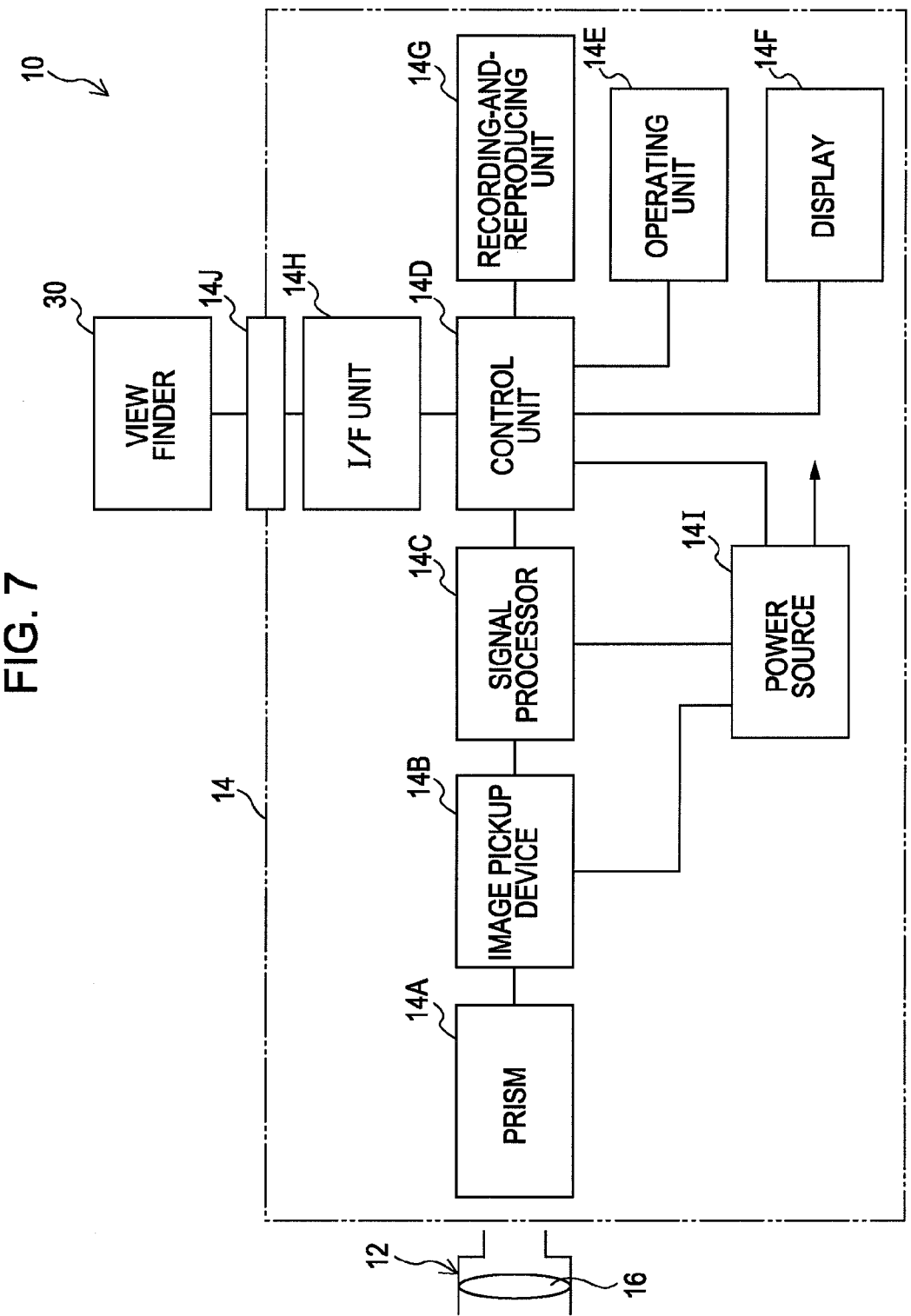
FIG. 7 is a block diagram illustrating the structure of the image pickup apparatus.

FIGS. 1 and 2 are perspective views of an image pickup apparatus 10 including a viewfinder 30. FIG. 3 is a perspective view of the image pickup apparatus 10 illustrating a first folded state of a display panel 42. FIG. 4 is a perspective view of the image pickup apparatus 10 illustrating an unfolded state of the display panel 42 in which a display surface 3402 faces frontward. FIG. 5 is a perspective view of the image pickup apparatus 10 illustrating an unfolded state of the display panel 42 in which the display surface 3402 faces rearward. FIG. 6 is a perspective view of the image pickup apparatus 10 illustrating a second folded state of the display panel 42. FIG. 7 is a block diagram illustrating the structure of the image pickup apparatus 10.

In the present embodiment, the image pickup apparatus 10 is a video camera used for business purposes in a broadcast station or the like.

Referring FIG. 1, the image pickup apparatus 10 includes a camera body 14 extending in a front-rear direction. A lens barrel 12 is attached to a front portion of the camera body 14.

In this specification, the terms "left" and "right" respectively mean the left and right as viewed from the back of the image pickup apparatus 10. In addition, the term "front" means the object side along an optical axis of an optical system and the term "rear" means the image side at which an image pickup device is disposed.

The lens barrel 12 accommodates an imaging optical system 16.

The imaging optical system 16 guides an object image to an image pickup device 14B shown in FIG. 7. Various kinds of image pickup devices, such as charge-coupled devices (CCD) and complementary metal-oxide semiconductor (C-MOS) sensors, may be used as the image pickup device 14B.

As shown in FIG. 1, the camera body 14 includes a chassis 18 that functions as a housing.

The chassis 18 has a front face 18A that faces forward, a rear face 18B that faces rearward, left and right faces 18C and 18D that faces left and right, respectively, a top face 18E that faces upward, and a bottom face 18F that faces downward.

In the present embodiment, the chassis 18 is shaped such that the height in the vertical direction between the top face 18E and the bottom face 18F is larger than the width in the left-right direction between the left and right faces 18C and 18D, and the length in the front-rear direction between the front face 18A and the rear face 18B is larger than the height. Thus, the chassis 18 has a rectangular parallelepiped shaped extending in the front-rear direction.

As shown in FIG. 2, a camera-body attachment 19 for allowing the viewfinder 30, which will be described below, to be detachably attached is disposed in a front section of the chassis 18. A handle 20 used for carrying the image pickup apparatus 10 is disposed behind the camera-body attachment 19.

As shown in FIG. 1, an upwardly recessed shoulder pad 22 used for placing the image pickup apparatus 10 on a shoulder is provided at the bottom face 18F. The shoulder pad 22 is made of a flexible, elastic material.

A control system of the camera body 14 will now be described with reference to FIG. 7.

As shown in FIG. 7, the camera body 14 includes, in addition to the image pickup device 14B, a prism 14A, a signal processor 14C, a control unit 14D, an operating unit 14E, a display 14F, a recording-and-reproducing unit 14G, an I/F unit 14H, and a power source 14I.

In the present embodiment, the image pickup device 14B includes three image-pickup elements for three colors (red, green, and blue). The prism 14A separates a light beam guided from the imaging optical system 16 and forming an object image into three light beams of three colors (red, green, and blue), and guides the light beams to the respective image-pickup elements in the image pickup device 14B.

The signal processor 14C drives the image pickup device 14B and performs a series of preprocessing operations for the video signals supplied from the image pickup device 14B. The preprocessing operations include correlated double sampling (CDS) for maintaining the S/N ratio at an adequate value, automatic gain control (AGC) for controlling the gain, and analog-to-digital (A/D) conversion for generating video data in the form of digital signals. Then, the signal processor 14C compresses (encodes) the video data, which is obtained as a result of the preprocessing operations, using a predetermined compressing method, thereby generating video data for recording. The thus-generated video data for recording is fed to the recording-and-reproducing unit 14G through the control unit 14D.

In addition, the signal processor 14C supplies the video signals that are not yet converted from analog to digital to the viewfinder 30 through a connector 14J, so that the image being captured can be displayed on the viewfinder 30. The signal processor 14C also supplies the video signals obtained as a result of the preprocessing operations to an external display device or the like through the connector 14J, so that the image being captured can be displayed on the external display device.

The recording-and-reproducing unit 14G records the video data supplied from the signal processor 14C through the control unit 14D in a recording medium. In addition, the recording-and-reproducing unit 14G supplies video data read from the recording medium to the viewfinder 30 or to the external display device through the control unit 14D.

The recording medium may be various kinds of recording media such as a magnetic recording tape, an optical disc, and a hard disc.

The I/F unit 14H allows communication of the video signals between the control unit 14D and the viewfinder 30 and receives and transmits control signals regarding the communication.

The operating unit 14E includes switches and volume controls operated to configure various settings for the operation of the image pickup apparatus 10.

The display 14F includes displays and LED lamps for displaying the operational state of the image pickup apparatus 10.

The control unit 14D controls the signal processor 14C, the I/F unit 14H, the operating unit 14E, the display 14F, and the recording-and-reproducing unit 14G.

More specifically, the control unit 14D includes a microcomputer having a central processing unit (CPU), a random access memory (RAM) that provides working areas, a read-only memory (ROM) that stores control programs and the like, and a peripheral large-scale integrated circuit (LSI) for communicating the control signals and data signals between the signal processor 14C, the I/F unit 14H, the operating unit 14E, and the display 14F. The CPU executes the control programs stored in the ROM to implement various control operations.

The power source 14I generates electric power using electric power supplied from an external power source (not shown) and supplies the thus-generated electric power to the image pickup device 14B, the signal processor 14C, the I/F unit 14H, the operating unit 14E, the display 14F, and the recording-and-reproducing unit 14G, so that these units can be operated. The electric power from the power source 14I is also supplied to the viewfinder 30 through the connector 14J so that the viewfinder 30 can be operated.

In the present embodiment, the recording-and-reproducing unit 14G is installed in the camera body 14. However, the recording-and-reproducing unit 14G may also be disposed outside the camera body 14. In such a case, the recording-and-reproducing unit 14G and the camera body 14 are connected to each other with a cable, so that the video signals and the like can be transmitted and received via the cable.

The viewfinder 30 will now be described.

As shown in FIGS. 1 and 2, the viewfinder 30 includes a display unit 31 and an eyepiece unit 36.

The display unit 31 includes a main body 32 and a display device 34.

The main body 32 includes circuits for operating the display device 34.

The display device 34 includes the display surface 3402 (see FIG. 3) and displays an image on the display surface 3402 on the basis of the video signals supplied from the camera body 14.

The eyepiece unit 36 magnifies the image displayed on the display surface 3402 of the display device 34.

In the present embodiment, the display device 34 includes a liquid-crystal display as a display for displaying the image.

The display is not limited to the liquid-crystal display, and other various displays, such as an organic EL display, may also be used.

Figure 8:
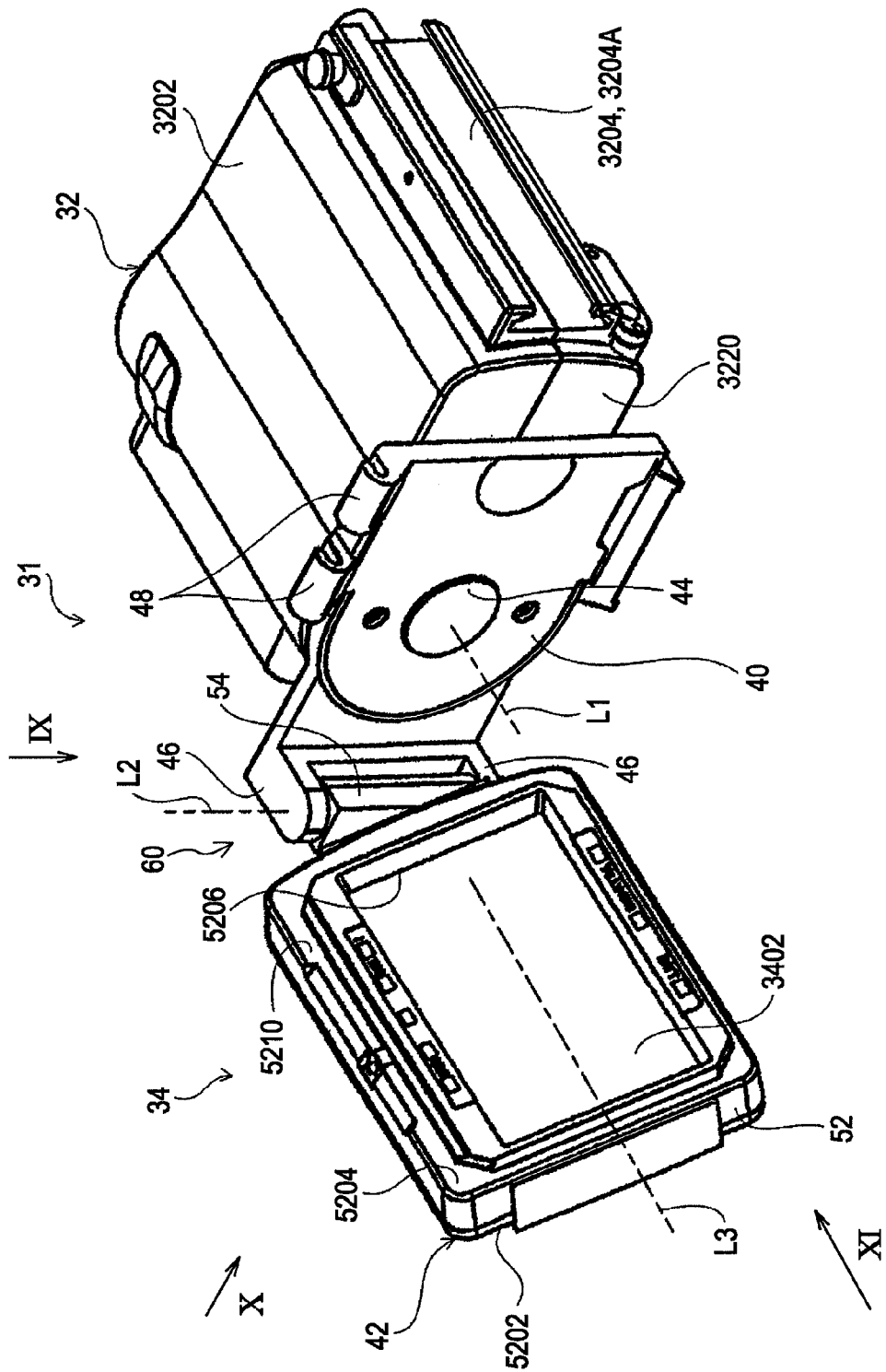
FIG. 8 is a perspective view of a main body and a display device.
Figure 9:
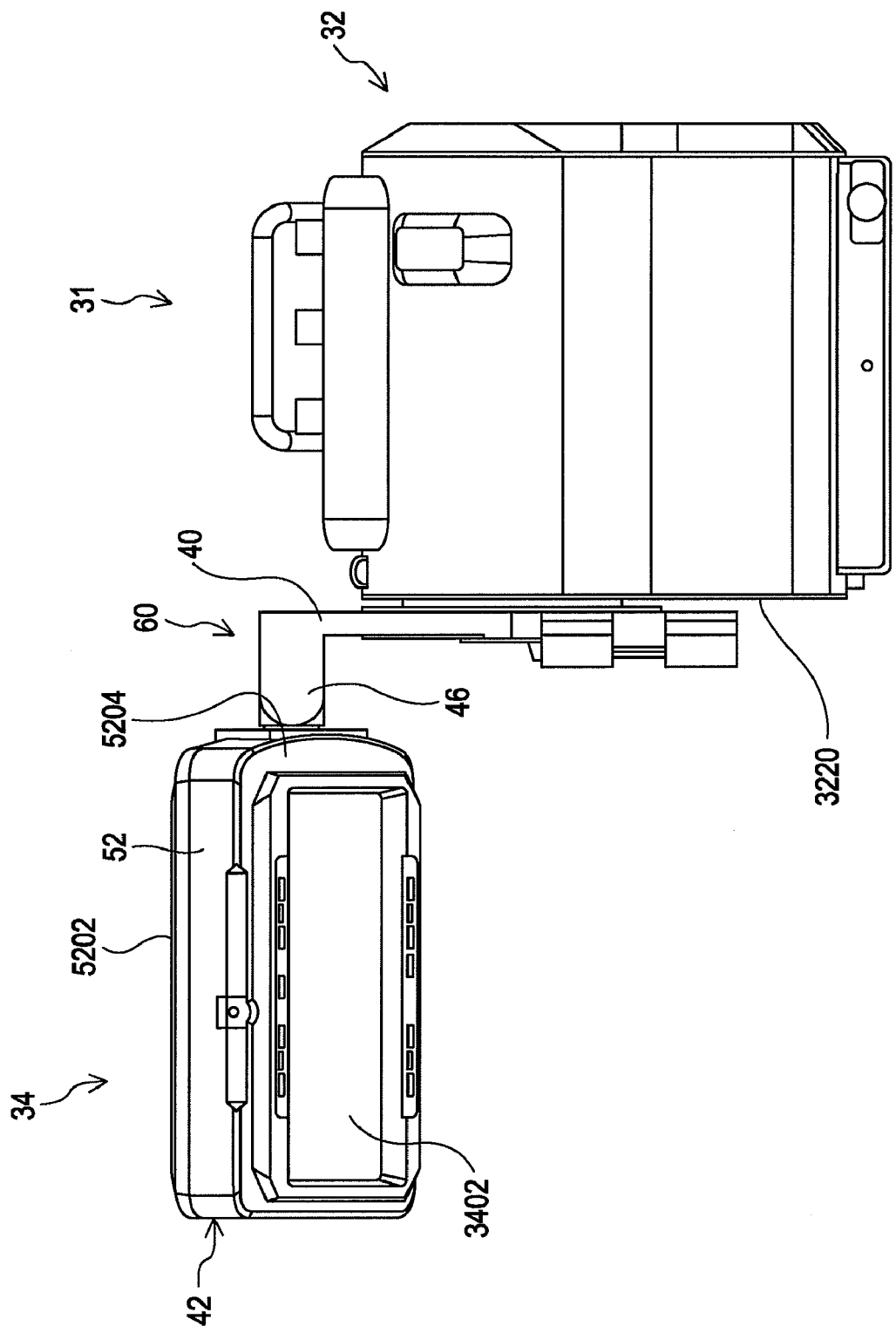
FIG. 9 is a plan view of FIG. 8 as seen in the direction of arrow IX.
Figure 10:
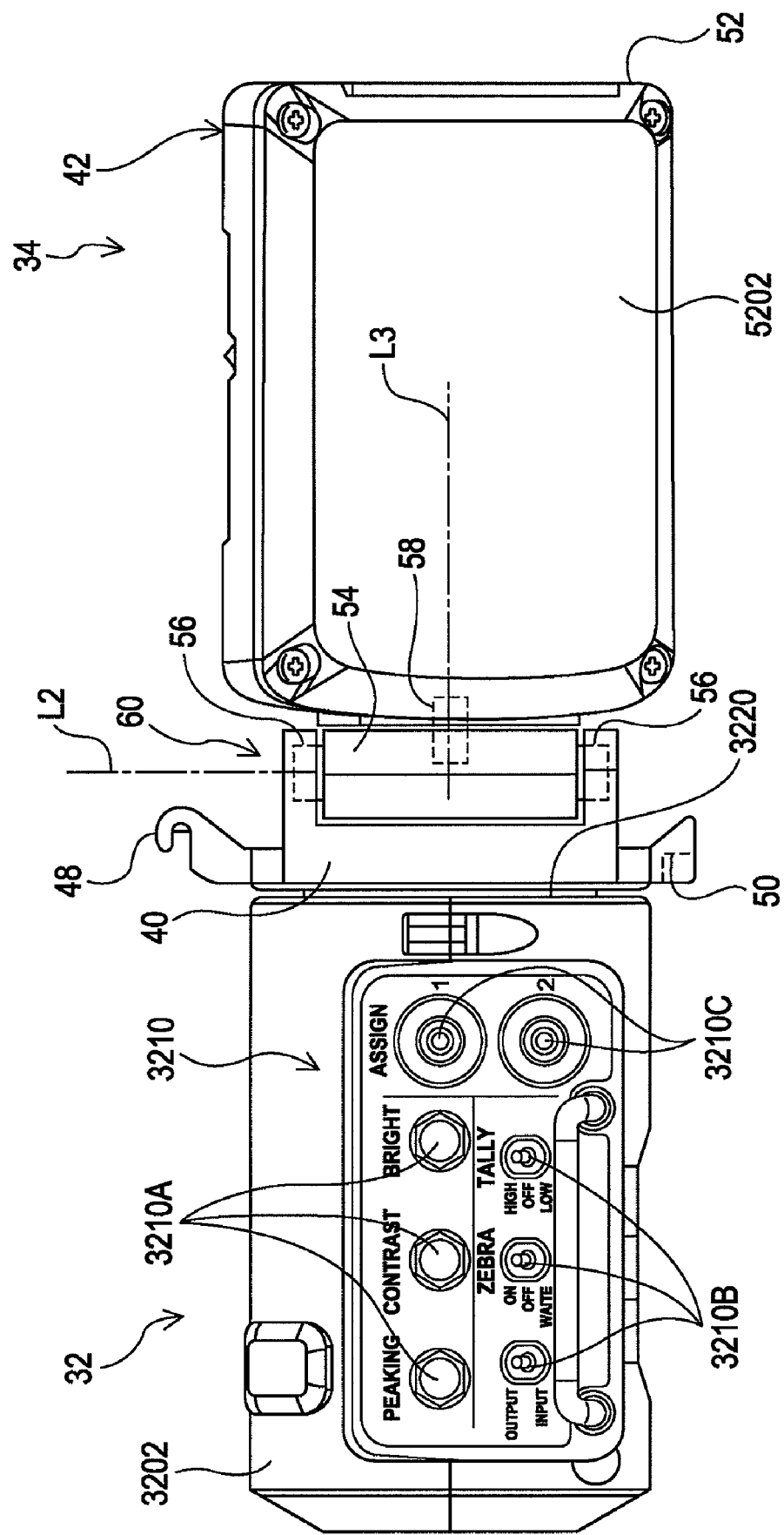
FIG. 10 is a plan view of FIG. 8 as seen in the direction of arrow X.
Figure 11:
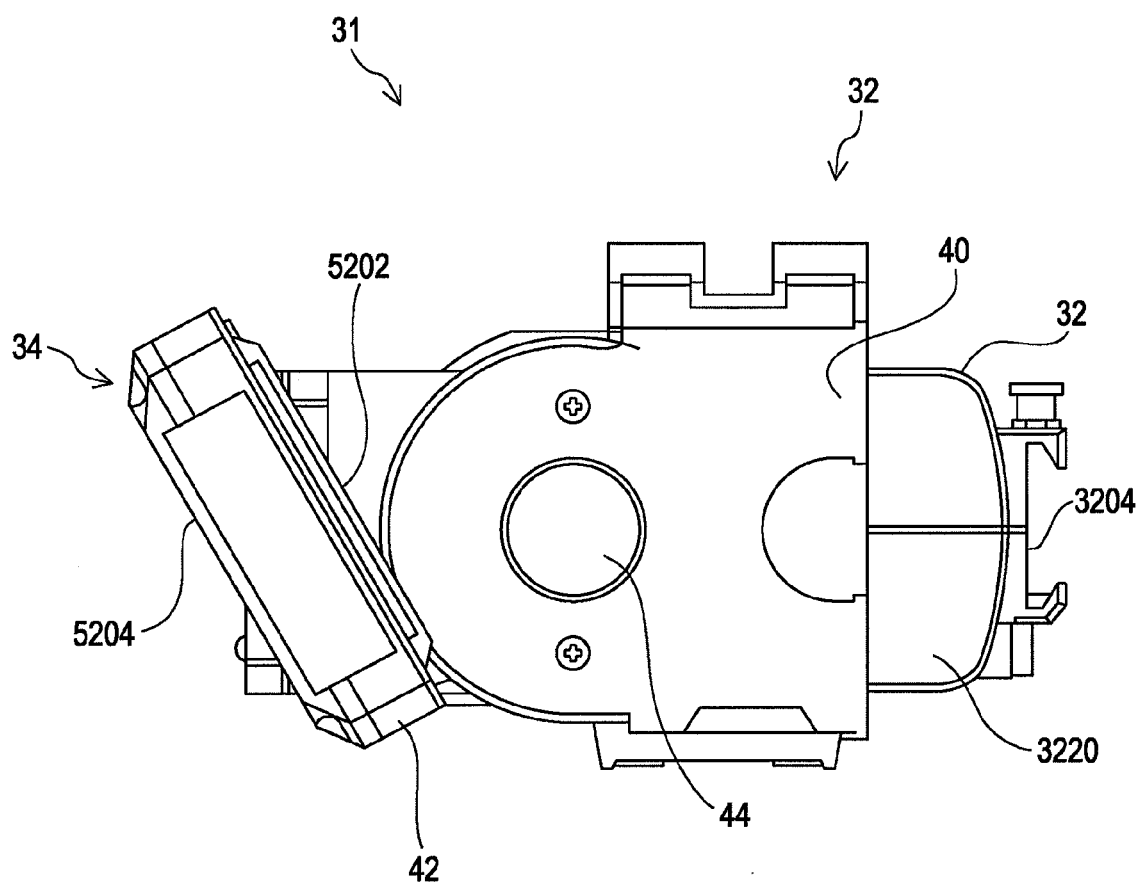
FIG. 11 is a plan view of FIG. 8 as seen in the direction of arrow XI.

FIG. 8 is a perspective view of the main body 32 and the display device 34. FIG. 9 is a plan view of FIG. 8 as seen in the direction of arrow IX. FIG. 10 is a plan view of FIG. 8 as seen in the direction of arrow X. FIG. 11 is a plan view of FIG. 8 as seen in the direction of arrow XI.

As shown in FIG. 8, the main body 32 includes a casing 3202. The casing 3202 has a main-body attachment 3204 that can be detachably attached to the camera-body attachment 19 (see FIG. 2).

In the present embodiment, the main-body attachment 3204 has an engagement groove 3204A extending in the left-right direction on a rear surface that faces rearward in the state in which the main body 32 is attached to the camera body 14. Various structures can be used as the structure for detachably attaching the main-body attachment 3204 to the camera-body attachment 19.

As shown in FIGS. 1 and 10, an operating unit 3210 used for controlling the operations of the display unit 34 is provided on the front surface of the casing 3202 that faces forward in the state in which the main body 32 is attached to the camera body 14. Another operating unit (not shown) is provided on the bottom surface of the casing 3202 that faces downward.

As shown in FIG. 10, the operating unit 3210 provided on the front surface of the casing 3202 includes volume controls 3210A, switches 3210B, and pressing buttons 3210C.

In addition, as shown in FIGS. 5, 8, and 10, a surface of the main body 32 that faces leftward in the state in which the main body 32 is attached to the camera body 14 serves as a connection surface 3220 to which the display device 34 is connected.

As shown in FIGS. 8 to 10, the display device 34 includes a support 40, the display panel 42, and a connecting mechanism 60.

The support 40 is connected to the connection surface 3220 of the main body 32 in a rotatable manner. The support 40 is supported by the main body 32 such that the support 40 is rotatable around a shaft 44. Referring to FIG. 8, the support 40 is rotatable about a first imaginary axis L1 (center axis of the shaft 44). The first imaginary axis L1 extends in the left-right direction of the camera body 14 in the state in which the main body 32 is attached to the camera body 14.

A frictional resistance is applied to the shaft 44, and the support 40 is arranged such that the support 40 can be retained at a predetermined rotation angle. Such an arrangement can be obtained by various types of mechanisms such as a frictional resistance type and a click mechanism type.

The support 40 is formed of a plate having an elongated shape, and the width thereof is larger than the height thereof in the vertical direction.

As shown in FIG. 8, bearings 46 are formed so as to bulge at either end of a side of the support 40 that extends in a direction perpendicular to the longitudinal direction of the support 40.

In addition, as shown in FIG. 8, arc-shaped bearing walls 48 are provided at one of the sides of the support 40 extending in the longitudinal direction of the support 40. In addition, as shown in FIG. 10, retaining recesses 50 are provided in the other one of the sides of the support 40.

As shown in FIGS. 8 to 10, the display panel 42 includes a casing 52 that is shaped like a rectangular plate. The liquid-crystal display is accommodated in the casing 52.

The casing 52 has a front face 5204 and a rear face 5202 on the side opposite to the front face 5204.

The front face 5204 has a front-face plate 5210 having an opening 5206 and the display surface 3402 positioned in the opening 5206.

As shown in FIG. 10, a first rotational shaft 54 having a rectangular cross section is placed between the two bearings 46. The first rotational shaft 54 has small-diameter portions 56 at either end thereof, and the small-diameter portions 56 are rotatably connected to the bearings 46.

In FIGS. 8 and 10, the first rotational shaft 54 is rotatable about a second imaginary axis L2, which is the center axis of the first rotational shaft 54.

In the present embodiment, the second imaginary axis L2 extends in a plane perpendicular to the first imaginary axis L1.

Referring to FIG. 10, one of the two short sides of the casing 52 is connected to an intermediate portion of the first rotational shaft 54 by a second rotational shaft 58 such that the casing 52 is rotatable around the second rotational shaft 58.

In FIGS. 8 and 10, the casing 52 (display panel 42) rotates about a third imaginary axis L3, which is the center axis of the second rotational shaft 58 that connects the first rotational shaft 54 and the casing 52 to each other.

In the present embodiment, the third imaginary axis L3 is perpendicular to the second imaginary axis L2.

As described above, in the present embodiment, the connecting mechanism 60 connects a short side of the display panel 42 to an end of the support 40 in the longitudinal direction thereof. The first rotational shaft 54 extends in the vertical direction of the camera body 14 in the state in which the main body 32 is attached to the camera body 14.

In addition, in the present embodiment, the bearings 46, the first rotational shaft 54, and the second rotational shaft 58 form the connecting mechanism 60. The connecting mechanism 60 connects the display panel 42 to the support 40 such that the display panel 42 can rotate about the second imaginary axis L2 and rotate about the third imaginary axis L3 relative to the support 40.

The connecting mechanism 60 is structured such that the first rotational shaft 54 can be retained at a desired rotation angle about the second imaginary axis L2 by the frictional resistance applied to the small-diameter portions 56. The connecting mechanism 60 is also structured such that the display panel 42 can be retained at a desired rotation angle about the third imaginary axis L3 by the frictional resistance applied to the second rotational shaft 58.

The connecting mechanism 60 may be various types of mechanisms such as a frictional resistance type and a click mechanism type.

The connecting mechanism 60 is capable of setting the support 40 and the display panel 42 to a first folded state in which the rear face 5202 of the display panel 42 is placed on the support 40 as shown in FIG. 3, a second folded state in which the display surface 3402 (front face 5204) of the display panel 42 is placed on the support 40 as shown in FIG. 6, and an unfolded state in which the display panel 42 stands upright from the support 40 as shown in FIG. 4.

The first folded state can be set by the connecting mechanism 60 by rotating the display panel 42 in the unfolded state about the third imaginary axis L3 and then rotating the display panel 42 about the second imaginary axis L2 such that the rear face 5202 of the display panel 42 is placed on the support 40.

The second folded state can be set by the connecting mechanism 60 by rotating the display panel 42 in the unfolded state about the third imaginary axis L3 and then rotating the display panel 42 about the second imaginary axis L2 while the display panel 42 faces the support 40 so that the display surface 3402 (front face 5204) of the display panel 42 is placed on the support 40.

When the main body 32 is attached to the camera body 14 and the display panel 42 is in the first folded state, as shown in FIG. 3, the display surface 3402 of the display panel 42 faces leftward on the camera body 14.

When the main body 32 is attached to the camera body 14 and the display panel 42 is in the second folded state, as shown in FIG. 6, the rear face 5202 of the display panel 42 faces leftward on the camera body 14.

In the state in which the main body 32 is attached to the camera body 14, the display panel 42 can be set in the unfolded state and be rotated about the third imaginary axis L3. Thus, the display panel 42 can be moved between the position where the display surface 3402 of the display panel 42 faces forward, as shown in FIG. 4, and the position where the display surface 3402 of the display panel 42 faces rearward, as shown in FIG. 5.

Figure 12:
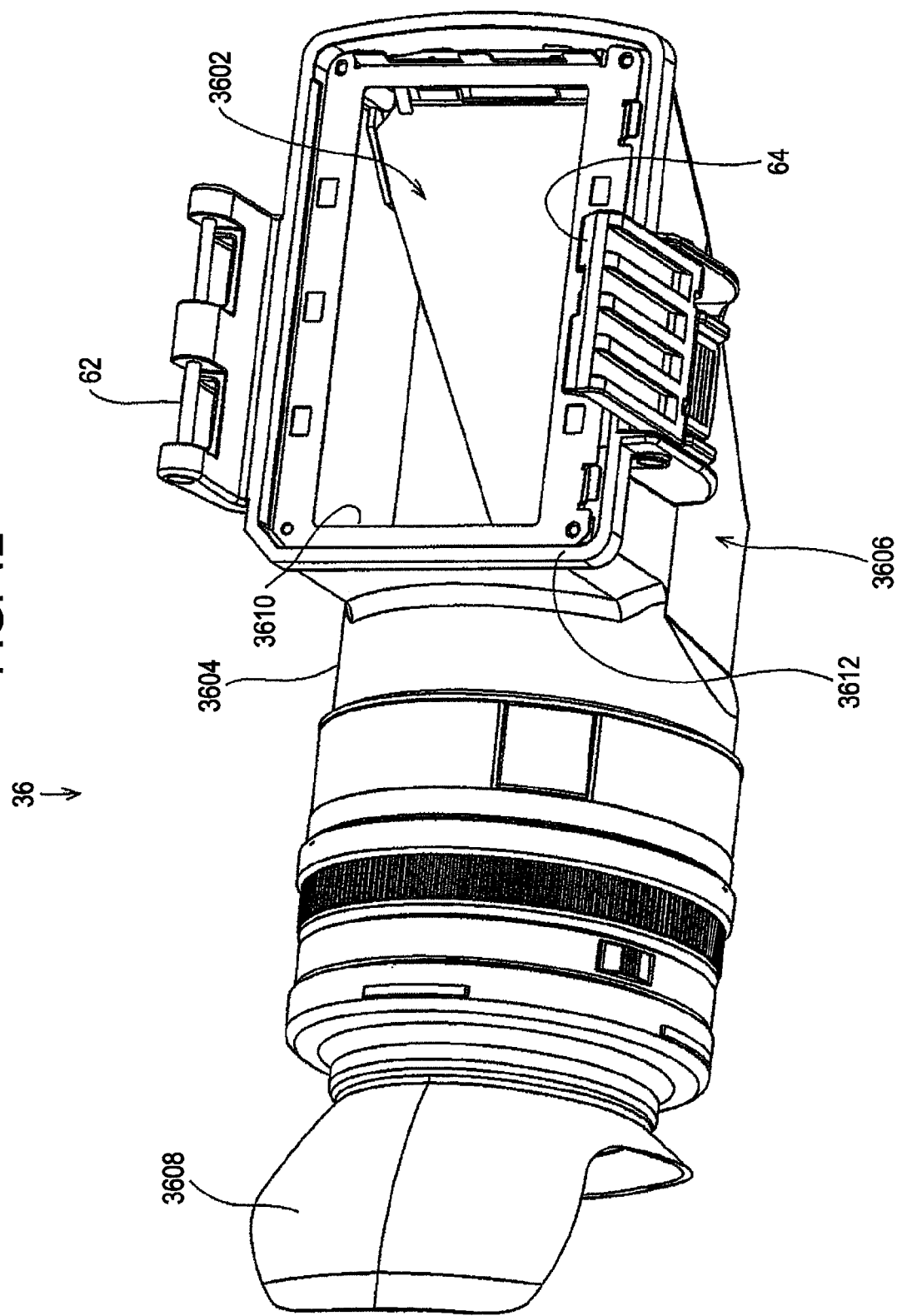
FIG. 12 is a perspective view of an eyepiece unit.
Figure 13:
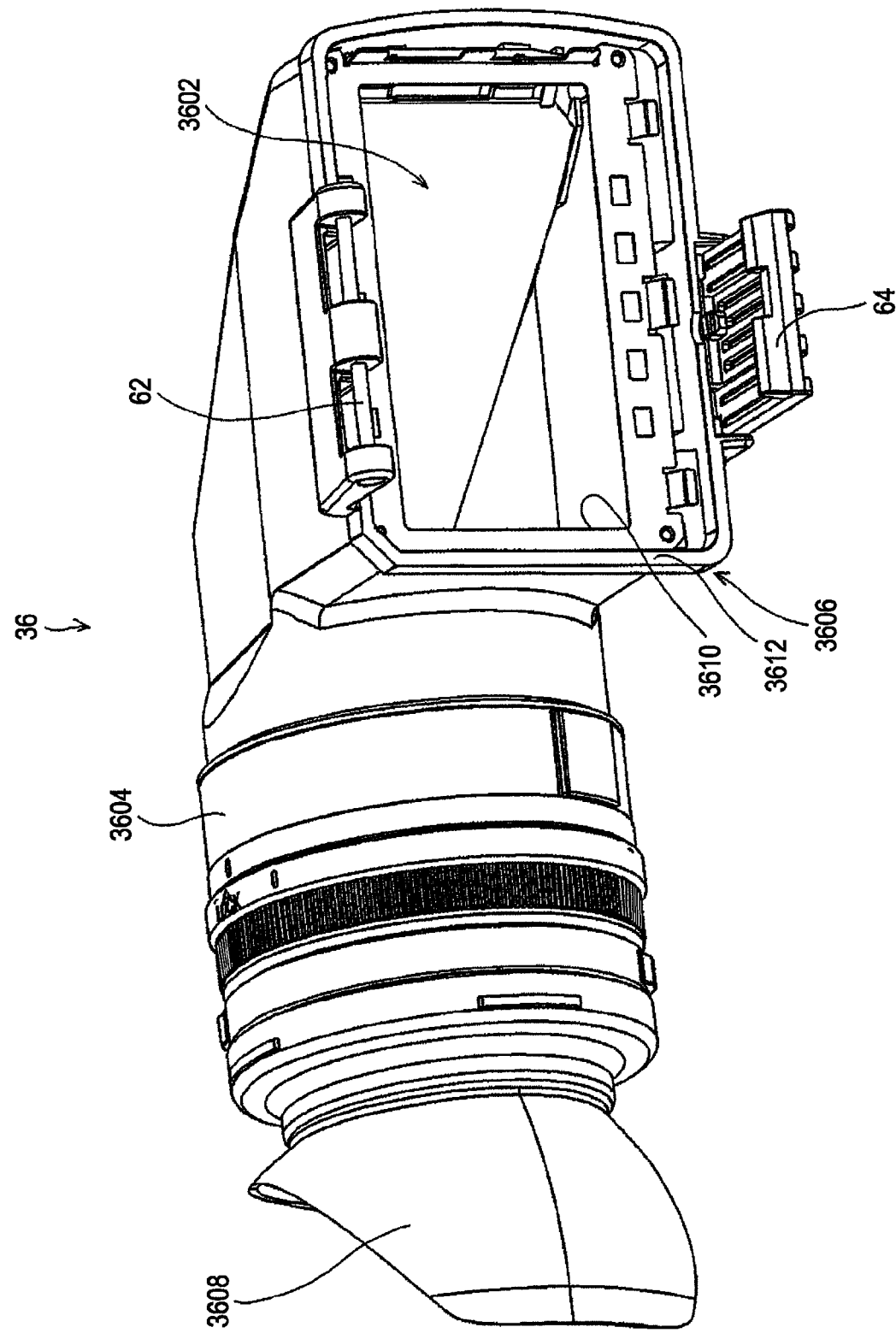
FIG. 13 is another perspective view of the eyepiece unit.
Figure 14:
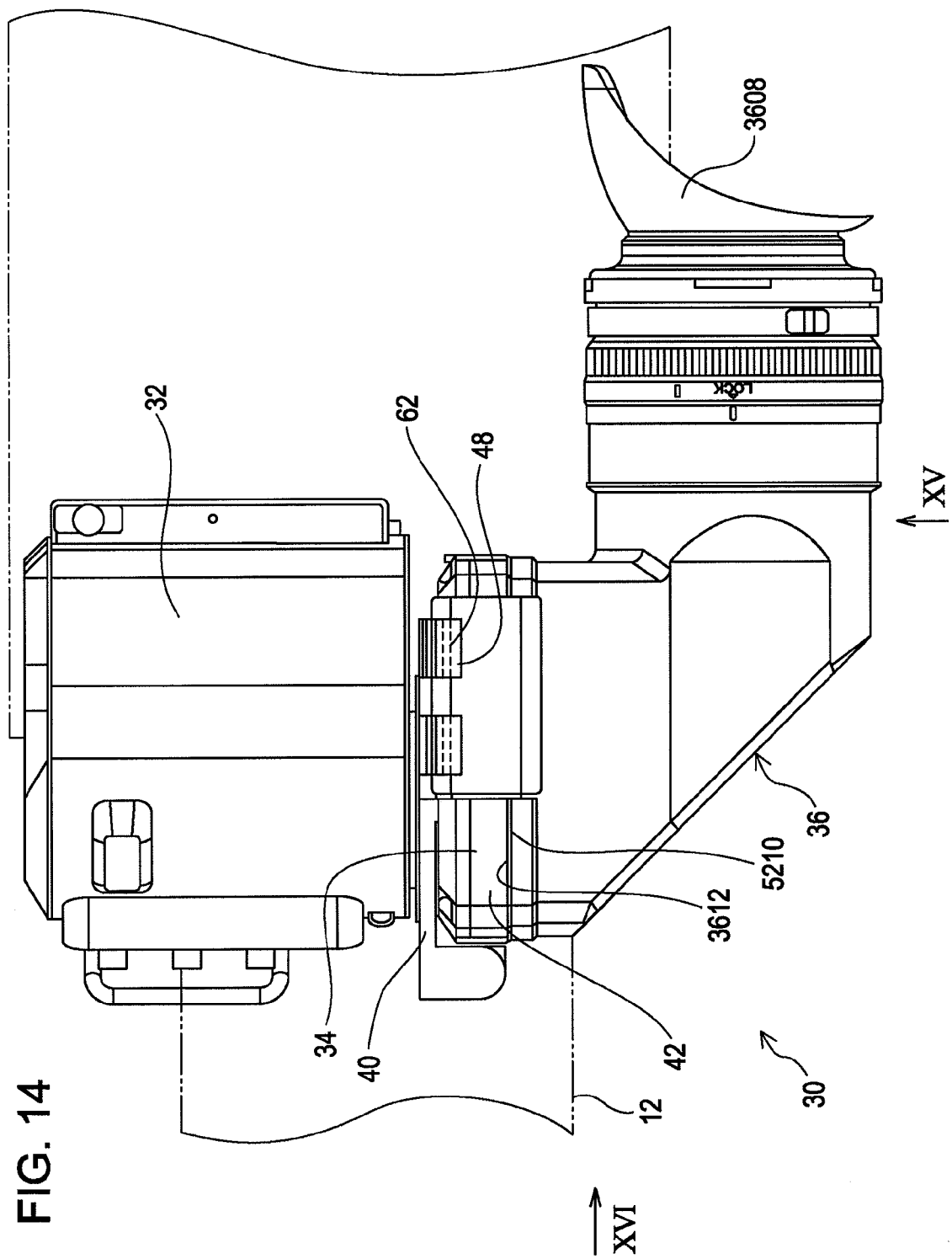
FIG. 14 is a plan view illustrating the state in which the eyepiece unit is attached.
Figure 15:
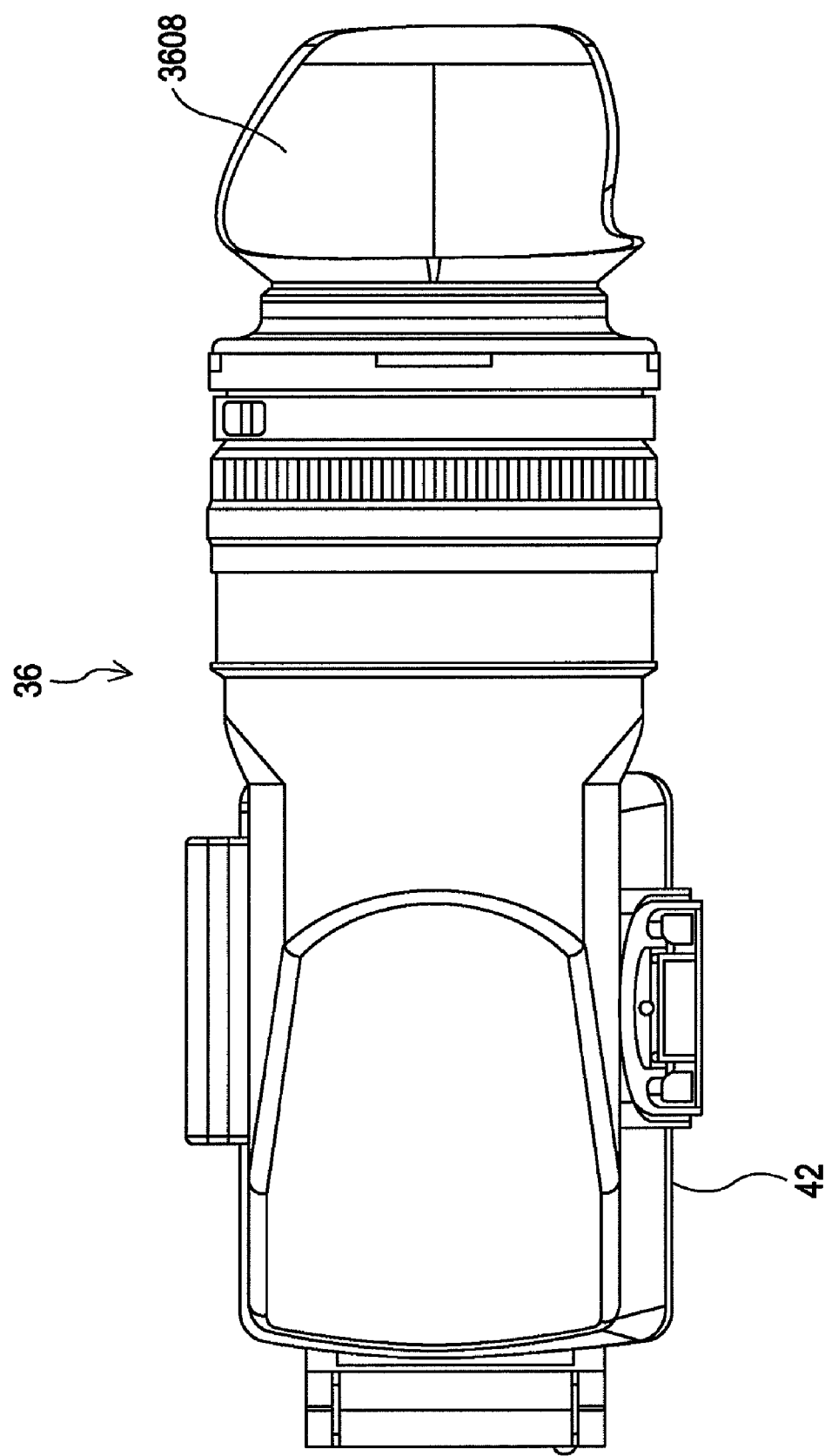
FIG. 15 is a plan view of FIG. 14 as seen in the direction of arrow XV.
Figure 16:
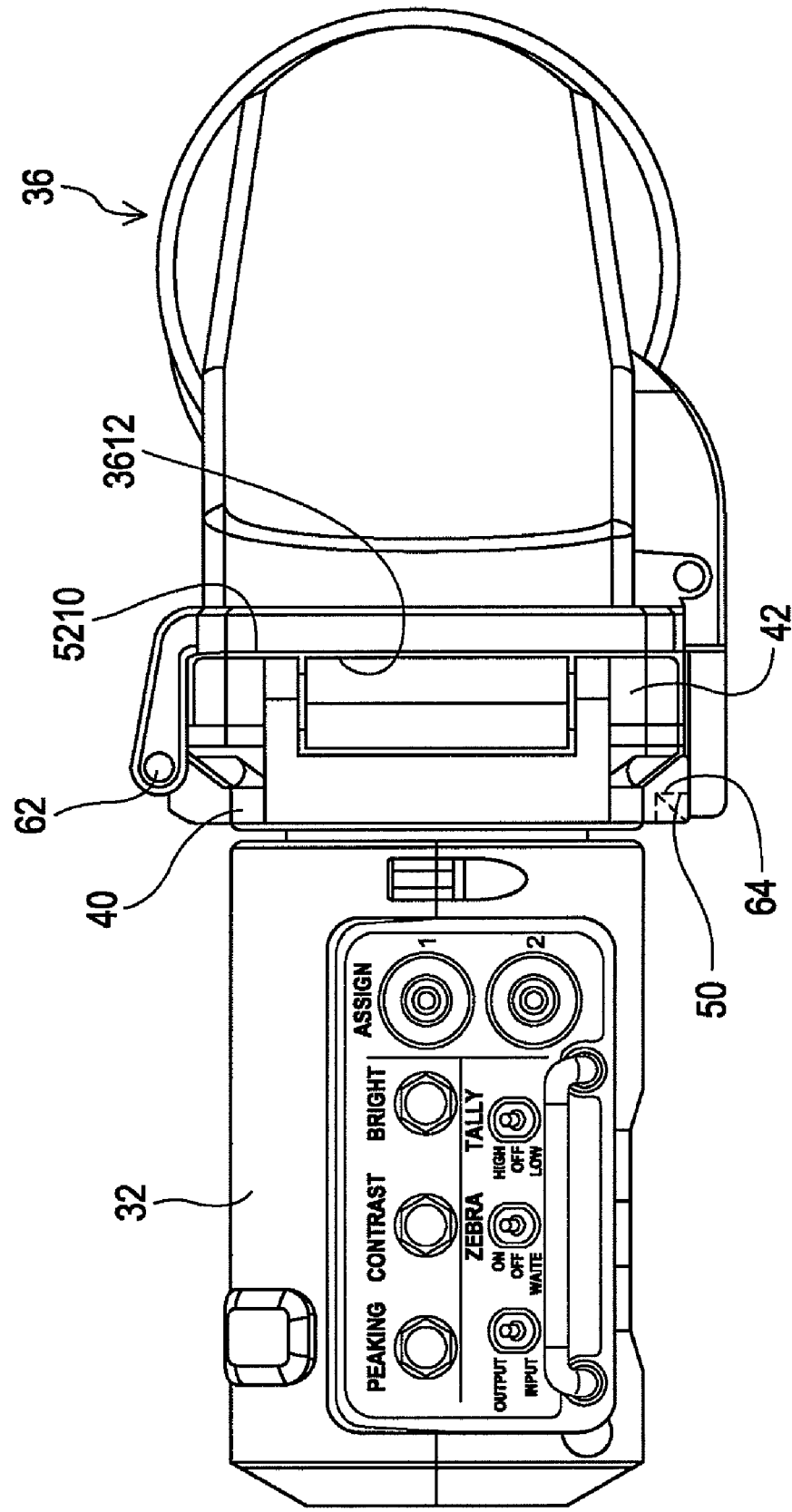
FIG. 16 is a plan view of FIG. 14 as seen in the direction of arrow XVI.

FIGS. 12 and 13 are perspective views of the eyepiece unit 36, FIG. 14 is a plan view illustrating the state in which the eyepiece unit 36 is attached, FIG. 15 is a plan view of FIG. 14 as seen in the direction of arrow XV, and FIG. 16 is a plan view of FIG. 14 as seen in the direction of arrow XVI.

As shown in FIGS. 12 and 13, the eyepiece unit 36 includes an optical system 3602 including a mirror and a plurality of lenses, a cylindrical housing 3604 accommodating the optical system 3602, an eyepiece-unit attachment 3606 disposed at one end of the housing 3604 in the longitudinal direction thereof, and an eyepiece 3608 disposed at the other end of the housing 3604 in the longitudinal direction thereof.

The eyepiece unit attachment 3606 has a horizontally long opening 3610 having a size corresponding to the size of the display surface 3402.

A frame portion 3612 is formed so as to extend along the periphery of the opening 3610. The frame portion 3612 is capable of pressing the front-face plate 5210 of the display panel 42.

Support shafts 62 that can be detachably attached to the bearing walls 48 are disposed at the top of the opening 3610. Retaining tabs 64 that can be engaged with the retaining recesses 50 in a releasable manner are disposed at the bottom of the opening 3610.

Referring to FIG. 14, the eyepiece unit 36 can be attached to the display device 34 by pressing the frame portion 3612 (see FIG. 12) against the front-face plate 5210 while the display panel 42 is in the first folded state.

More specifically, while the display panel 42 is in the first folded state, the support shafts 62 are engaged with the respective bearing walls 48, as shown in FIG. 14, and the retaining tabs 64 are engaged with the respective retaining recesses 50, as shown in FIG. 16. Thus, as shown in FIGS. 14 and 16, the frame portion 3612 presses the front-face plate 5210 and the eyepiece unit 36 is attached to the display unit 34, as shown in FIGS. 14 to 16.

Thus, an attachment mechanism for detachably attaching the eyepiece unit 36 to the display device 34 is formed by the support shafts 62, the bearing walls 48, the retaining tabs 64, and the retaining recesses 50. Various mechanisms can be used as the attachment mechanism.

The eyepiece unit 36 can be removed from the display device 34 by operating the retaining tabs 64 such that the retaining tabs 64 can be released from the retaining recesses 50 in the state in which the eyepiece unit 36 is attached to the display unit 34.

After the retaining tabs 64 are removed from the retaining recesses 50, the eyepiece unit 36 is rotated about the support shafts 62 so that the support shafts 62 can be released from the bearing walls 48.

Thus, the eyepiece unit 36 can be removed from the display device 34.

Next, the method for using the image pickup apparatus 10 and the viewfinder 30 will be described below.

In the state in which the eyepiece unit 36 is attached to the display unit 34 in the first folded state, as shown in FIGS. 1 and 2, the user can look through the eyepiece 3608 and see the image on the display surface 3402 that is magnified.

In such a case, the shooting angle can be changed in the vertical direction by rotating the display panel 42 and the eyepiece unit 36 about the first imaginary axis L1 (FIG. 8).

Therefore, the user can look through the eyepiece 3608 in a comfortable position irrespective or whether the user places the shoulder pad 22 of the camera body 14 on the shoulder or carries the camera body 14 by hand.

The eyepiece unit 36 can also be removed from the display unit 34 in the first folded state as shown in FIG. 3. Then, the display panel 42 can be rotated about the second imaginary axis L2 (FIG. 8) so as to set the display panel 42 in the unfolded state, as sown in FIG. 5, and be rotated about the third imaginary axis L3 (FIG. 8) so that the display surface 3402 faces rearward. In such a case, when the shoulder pad 22 of the camera body 14 is placed on the shoulder of the user, the user can directly see the display surface 3402 because the display surface 3402 faces rearward. In addition, even when the user carries the camera body 14 by hand, the user can directly see the display surface 3402 in a comfortable position because the display panel 42 can be rotated about the first imaginary axis L1. Therefore, shooting can be carried out while directly viewing the display surface 3402 and changing the shooting angle in the vertical direction.

Therefore, the user can perform shooting while directly viewing the display surface 3402 of the display panel 42 in a comfortable position irrespective of whether the user places the camera body 14 on the shoulder or carries the camera body 14 by hand.

The display device 34 in the first folded state shown in FIG. 3 can also be rotated about the second imaginary axis L2 (FIG. 8) to set the display panel 42 in the unfolded state in which the display surface 3402 faces forward, as shown in FIG. 4. In such a case, the user can perform shooting while viewing the image displayed on the display surface 3402 while the user is in front of the image pickup apparatus 10. In other words, the user can shoot an object behind the user.

When the image pickup apparatus 10 is moved, the display panel 42 in the unfolded state in which the display surface 3402 faces rearward, as shown in FIG. 5, is rotated about the second imaginary axis L2 so as to set the display panel 42 in the second folded state in which the display surface 3402 is placed on the support 40, as shown in FIG. 6. Thus, the space occupied by the display panel 42 on the camera body 14 can be reduced.

According to the present embodiment, in the case in which the eyepiece unit 36 is removed from the display device 34 and the display surface 3402 of the display panel 42 is directly viewed, the display panel 42 can be set in the unfolded state. In addition, the display panel 42 in the unfolded state can be rotated with respect to the main body 32. Therefore, the user can easily view the display surface 3402 of the display panel 42 without being in an uncomfortable position, and the user can freely change the shooting angle. Thus, the user friendliness is increased.

In addition, according to the present embodiment, when the display device 34 is in the second folded state, the overall size of the image pickup apparatus 10 can be reduced so that the portability of the image pickup apparatus 10 can be increased. In addition, since the display surface 3402 is placed on the support 40 and does not face outward, the display surface 3402 can be protected.

In addition, in the present embodiment, the display panel 42 rotates together with the support 40 about the first imaginary axis L1. Therefore, the display panel 42 in the unfolded state can be selectively positioned at a front position near the front end of the main body 32 and a rear position near the rear end of the main body 32.

Since the display panel 42 rotates about the third imaginary axis L3, the display panel 42 can be positioned such that the display surface 3402 faces rearward at both the front position and the rear position.

Therefore, when the user places the shoulder pad 22 of the camera body 14 on the shoulder and views the display surface 3402 of the display panel 42, the distance between the user's eyes and the display surface 3402 can be adjusted by moving the display panel 42 to the front position or the rear position. The distance between the user's eyes and the display surface 3402 can be adjusted in accordance with the eyesight or position of the user. Thus, the user friendliness can be increased.

In the present embodiment, the viewfinder 30 can be detachably attached to the camera body 14 of the image pickup apparatus 10. However, the main body 32 of the viewfinder 30 can be formed integrally with the camera body 14. The present invention can also be applied to the image pickup apparatus 10 having such a structure.

It should be understood by those skilled in the art that various modifications, combinations, sub-combinations and alterations may occur depending on design requirements and other factors insofar as they are within the scope of the appended claims or the equivalents thereof.

What is claimed is:

1. A viewfinder, comprising:
a main body detachably attached to a camera body;
a display unit on which an image captured at the camera body is displayed; and
an eyepiece unit detachably attached to the display unit, the eyepiece unit magnifying the image displayed by the display unit,
wherein the display unit includes
a support connected to the main body in a rotatable manner,
a display panel having a display surface on which the image is displayed, and
a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support,
wherein the camera body extends in a front-rear direction, and
wherein, in the state in which the main body is attached to the camera body, the support is connected to the main body such that the support is rotatable about a first imaginary axis that extends in a left-right direction, and
wherein the connecting mechanism includes
a first rotational shaft that connects the display panel to the support such that the display panel is rotatable about a second imaginary axis that extends in a plane perpendicular to the first imaginary axis, and
a second rotational shaft that connects the display panel to the support such that the display panel is rotatable about a third imaginary axis that is perpendicular to the second imaginary axis.

2. The viewfinder according to claim 1, wherein the first folded state is established by rotating the display panel in the unfolded state about the third imaginary axis and then rotating the display panel about the second imaginary axis so that the rear face is placed on the support, and
wherein the second folded state is established by rotating the display panel in the unfolded state about the third imaginary axis and then rotating the display panel about the second imaginary axis so that the display surface is placed on the support.

3. The viewfinder according to claim 1, wherein the support has an elongated shape whose width is larger than height, and
wherein the connecting mechanism connects an end of the display panel to an end of the support in the longitudinal direction thereof.

4. The viewfinder according to claim 1, wherein the support has an elongated shape whose width is larger than height,
wherein the display panel has a rectangular shape, and
wherein the connecting mechanism connects a short side of the display panel to an end of the support in a longitudinal direction thereof.

5. The viewfinder according to claim 1, wherein the support and the display panel are both plate-shaped, and
wherein the display panel and the support are parallel to each other in the first and the second folded states and the display panel and the support are perpendicular to each other in the unfolded state.

6. The viewfinder according to claim 1, further comprising an attaching-and-detaching mechanism capable of attaching attaches the eyepiece unit to the display unit and detaching the eyepiece unit from the display unit.

7. An image pickup apparatus, comprising:
a camera body that captures an image; and
a viewfinder provided on the camera body,
wherein the viewfinder includes
a main body detachably attached to the camera body;
a display unit on which an image captured at the camera body is displayed; and
an eyepiece unit detachably attached to the display unit, the eyepiece unit magnifying the image displayed by the display unit,
wherein the display unit includes
a support connected to the main body in a rotatable manner,
a display panel having a display surface on which the image is displayed, and
a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support, wherein the camera body extends in a front-rear direction, and
wherein, in the state in which the main body is attached to the camera body, the support is connected to the main body such that the support is rotatable about a first imaginary axis that extends in a left-right direction, and
wherein the connecting mechanism includes
a first rotational shaft that connects the display panel to the support such that the display panel is rotatable about a second imaginary axis that extends in a plane perpendicular to the first imaginary axis, and
a second rotational shaft that connects the display panel to the support such that the display panel is rotatable about a third imaginary axis that is perpendicular to the second imaginary axis.

8. An image pickup apparatus, comprising:
a camera body that captures an image; and
a viewfinder provided on the camera body,
wherein the viewfinder includes
a main body detachably attached to the camera body;
a display unit on which an image captured at the camera body is displayed; and
an eyepiece unit detachably attached to the display unit, the eyepiece unit magnifying the image displayed by the display unit,
wherein the display unit includes
a support connected to the main body in a rotatable manner,
a display panel having a display surface on which the image is displayed, and
a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support, wherein the camera body extends in a front-rear direction,
wherein, in the state in which the main body is attached to the camera body, the support is connected to the main body such that the support is rotatable about a first imaginary axis that extends in a left-right direction, and
wherein the display surface faces leftward or rightward with respect to the camera body in the first folded state, the rear face leftward or rightward with respect to the camera body in the second folded state, and the display surface forward, rearward, upward, or downward in the unfolded state.

9. An image pickup apparatus, comprising:
a camera body that captures an image; and
a viewfinder provided on the camera body,
wherein the viewfinder includes
a main body formed integrally with the camera body;
a display unit on which an image captured at the camera body is displayed; and
an eyepiece unit detachably attached to the display unit, the eyepiece unit magnifying the image displayed by the display unit,
wherein the display unit includes
a support connected to the main body in a rotatable manner,
a display panel having a display surface on which the image is displayed, and
a connecting mechanism that connects the display panel to the support in a rotatable manner such that the support and the display panel can be set to a first folded state in which a rear surface of the display panel that is opposite to the display surface is placed on the support, a second folded state in which the display surface of the display panel is placed on the support, and an unfolded state in which the display panel is raised from the support,
wherein the camera body extends in a front-rear direction, and
wherein, in the state in which the main body is attached to the camera body, the support is connected to the main body such that the support is rotatable about a first imaginary axis that extends in a left-right direction, and
wherein the connecting mechanism includes
a first rotational shaft that connects the display panel to the support such that the display panel is rotatable about a second imaginary axis that extends in a plane perpendicular to the first imaginary axis, and
a second rotational shaft that connects the display panel to the support such that the display panel is rotatable about a third imaginary axis that is perpendicular to the second imaginary axis.

* * * * *